(12) United States Patent
Segev et al.

(10) Patent No.: US 6,801,257 B2
(45) Date of Patent: Oct. 5, 2004

(54) OPTICAL THREE-DIMENSIONAL DIGITAL IMAGING AND MENSURATION SYSTEM FOR INDUSTRIAL APPLICATIONS

(75) Inventors: Avner Segev, Raanana (IL); Israel Lasker, Kfar Saba (IL); Yishai Galatzer, Neve Mivtach (IL)

(73) Assignee: CogniTens Ltd.

( * ) Notice: Subject to any disclaimer, the term of this patent is extended or adjusted under 35 U.S.C. 154(b) by 0 days.

(21) Appl. No.: 10/044,830

(22) Filed: Jan. 12, 2002

(65) Prior Publication Data

US 2002/0140821 A1 Oct. 3, 2002

Related U.S. Application Data

(60) Provisional application No. 60/261,604, filed on Jan. 12, 2001.

(51) Int. Cl.[7] ........................ H04N 3/14; H04N 5/335
(52) U.S. Cl. .................. 348/296; 348/362; 348/370
(58) Field of Search ..................... 348/370, 296, 348/362, 363

(56) References Cited

U.S. PATENT DOCUMENTS

| | | | | |
|---|---|---|---|---|
| 3,988,749 A | * | 10/1976 | Frode et al. | 396/231 |
| 5,471,242 A | * | 11/1995 | Kondo | 348/296 |
| 5,574,511 A | * | 11/1996 | Yang et al. | 348/586 |
| 5,751,348 A | * | 5/1998 | Inuiya et al. | 348/371 |
| 6,167,151 A | | 12/2000 | Albeck et al. | |
| 6,556,705 B1 | | 4/2003 | Shalom | |
| 2001/0002850 A1 | * | 6/2001 | Slatter | 348/370 |
| 2001/0017651 A1 | * | 8/2001 | Baker et al. | 348/169 |
| 2002/0081111 A1 | * | 6/2002 | Ina et al. | 396/155 |

* cited by examiner

*Primary Examiner*—Wendy R. Garber
*Assistant Examiner*—Jason Whipkey
(74) *Attorney, Agent, or Firm*—Nath & Associates PLLC; Marvin C. Berkowitz; Derek Richmond

(57) ABSTRACT

An image acquisition arrangement that acquires at least one image of at least one portion of a scene has a camera and an illumination source controlled by a control module. The camera includes an image recording medium and a shutter controllable to enable the image recording medium to acquire the image. The illumination source is configured to illuminate the scene for a selected time period. The control module controls the camera and illumination source to facilitate acquisition of the image by the camera, the control module enabling the shutter to, in turn, enable the image recording medium to acquire the image and contemporaneously to enable the illumination source to illuminate the scene, the time period during which the shutter enables the image recording medium to record an image being a function of the time period during which the at least one illumination source illuminates the scene.

28 Claims, 2 Drawing Sheets

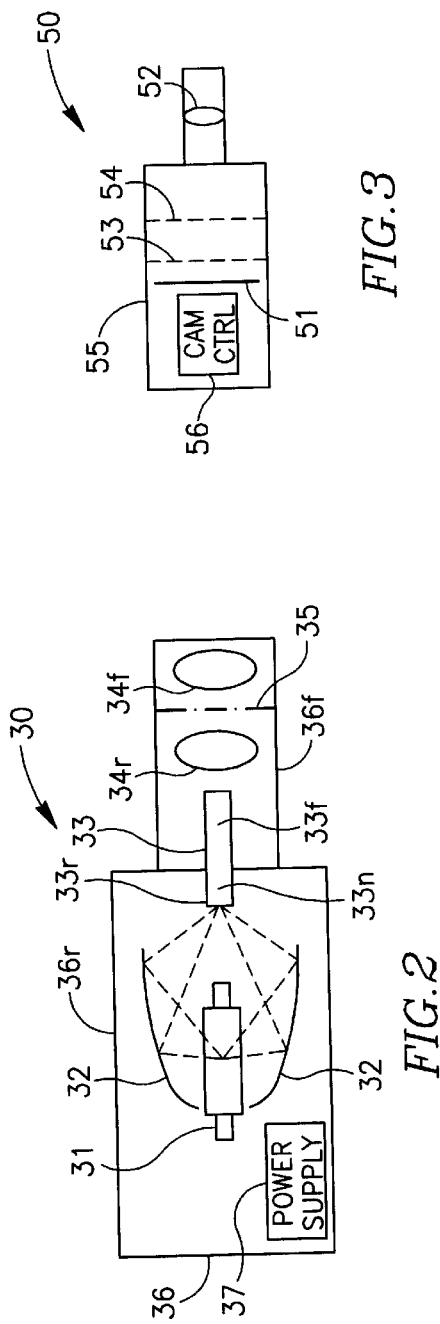
FIG.2
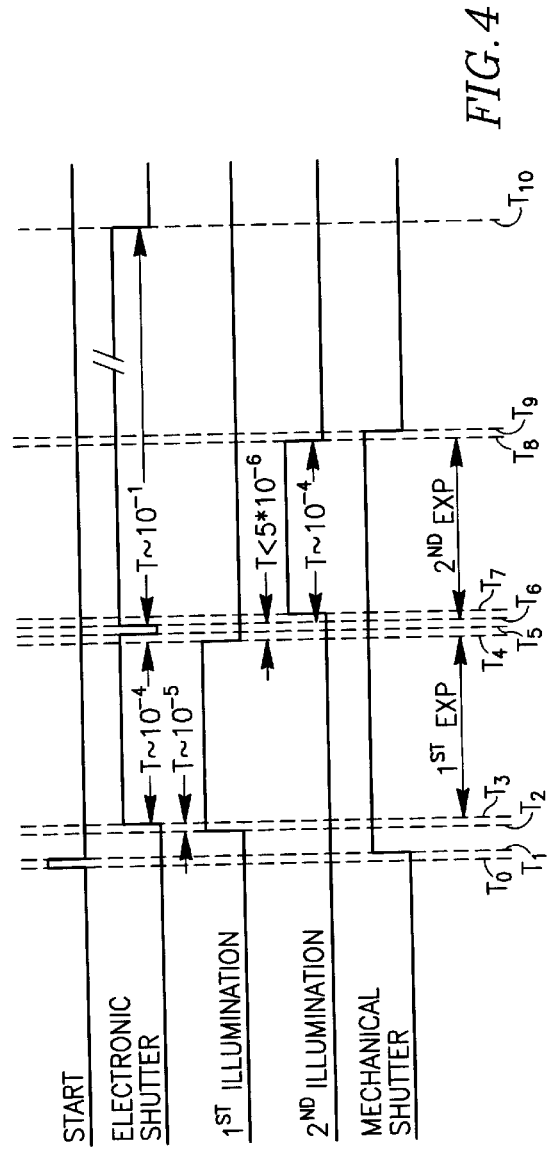
FIG.3
FIG.4

OPTICAL THREE-DIMENSIONAL DIGITAL IMAGING AND MENSURATION SYSTEM FOR INDUSTRIAL APPLICATIONS

This appication claims the benefits of Provisional Application 60/261,604 filed Jan. 12, 2001.

FIELD OF THE INVENTION

The invention relates generally to the field of digital imaging, and more particularly to optical three-dimensional imaging and mensuration systems for industrial applications.

BACKGROUND OF THE INVENTION

Digital imaging systems acquire, or record, many two-dimensional images of a scene for various types of applications. One illustrative type of application is photogrammetry, in which information such as distances between points on objects in a scene, heights of such points above a reference level, and so forth, can be determined from measurements between and among points on the two-dimensional images that were acquired of the scene. Another type of application is generation of three-dimensional virtual reconstructions of objects in a scene from the two-dimensional images that were acquired of the scene. Such virtual reconstructions can be used, for example, for precise measurement of features of the reconstructed objects, comparisons between an actual object as represented by its reconstruction and the desired design for the object, and for other uses as will be apparent to those skilled in the art. In yet another application, virtual two-dimensional images of the scene can be generated from directions from which the digital imaging systems did not acquire actual images.

Typically, in any of these applications, it is necessary to use at least two images of a portion of a scene in order to, for example, generate a reconstruction of that portion of the scene. In addition, a digital imaging system may make use of more than two images which may increase accuracy. Although a digital imaging system can make use of a single camera to capture the images of the portion of the scene, some digital imaging systems make use of more than one camera, with the cameras being supported in fixed displacement and angular orientation relative to each other. One illustrative digital imaging system is described in U.S. Pat. No. 6,167,151, issued Dec. 26, 2000, in the names of Dan Albeck, et al., and entitled "Apparatus And Method For 3-Dimensional Surface Geometry Reconstruction," assigned to the assignee of this application, incorporated by reference.

If the portion of the scene that a digital imaging system reconstructs from one set of images is not the entire scene of interest, it may be necessary to move at least the cameras of the digital imaging system to other positions and angular orientations relative to the scene to enable them to capture images of the other portions. In that case, the digital imaging system will, for example, generate reconstructions of the portion of the scene based on the set of images that were acquired in each of the various positions. Each reconstruction will be relative to a coordinate system that, in turn, is related to the location(s) of the cameras from which the respective reconstruction was generated, and the digital imaging system can relate the reconstructions to a common "global" coordinate system to "stitch" the reconstructions together. This allows, for example, a feature in a portion of the scene that is present in one reconstruction to be related to a feature that is present in another reconstruction. Several illustrative methodologies for stitching reconstructions generated relative to respective coordinate systems are described in the aforementioned Albeck patent, and in U.S. patent application Ser. No. 09/606,054, filed Jun. 28, 2000, in the name of Tamir Shalom, now U.S. Pat. No. 6,556,705, entitled System And Method For Aligning A Locally-Reconstructed Three-Dimensional Object To A Global Coordinate System Using Partially-Detected Control Points, assigned to the assignee of this application and incorporated by reference. Generally, those methodologies make use of points on objects in the scene that are reconstructed in two reconstructions. In the methodology described in the Albeck patent, one reconstruction is stitched to another using reconstructions of the same points of the scene. In that case, the two reconstructions would need to overlap to enable them to be stitched together. In addition, in that case, the global coordinate system would be associated with the coordinate system associated with one of the reconstructions. In another methodology, described in the Shalom application, "targets" are provided in the scene whose positions relative to a global coordinate system are known. In that case, positions of the targets in the various reconstructions are used to align the reconstructions to the global coordinate system.

Digital imaging systems have generally been able to provide good results in environments in which environment variables such as temperature, humidity, mechanical vibrations, electromagnetic interference, and so forth, can be fairly rigidly controlled. Changes in temperature and humidity can, for example, cause rigs that provide support for cameras, illumination sources and the like to expand and contract undesirably, since expansion and contraction can change the positions and angular orientations of the cameras relative to each other. Mechanical vibration can arise when a rig moves the cameras, illumination sources and the like from one location and/or angular orientation relative to a scene, to another location and/or angular orientation. If mechanical vibration occurs, the digital imaging system may need to wait until the vibration subsides to allow the cameras to acquire the necessary images, which can unduly delay the acquisition. However, these problems, as well as others, can prevent digital imaging systems from being used in industrial environments, in particular in the manufacturing process, where such environmental variables cannot be rigidly controlled.

SUMMARY OF THE INVENTION

The invention provides a new and improved optical three-dimensional digital imaging and mensuration system for industrial applications.

In brief summary, the invention in one aspect provides an image acquisition arrangement for acquiring at least one image of at least one portion of a scene, the image acquisition arrangement comprising a least one camera and at least one illumination source controlled by a control module. In that aspect, the at least one camera includes an image recording medium and at least one shutter controllable to enable the image recording medium to acquire the at least one image. The at least one illumination source is configured to illuminate the at least one portion of the scene for a selected time period. The control module is configured to control the at least one camera and at least one illumination source to facilitate acquisition of the at least one image by the at least one camera, the control module being configured to enable the shutter of the at least one camera to, in turn, enable the image recording medium to acquire the at least one image and contemporaneously to enable the at least one illumination source to illuminate the at least one portion of the scene, the time period during which the shutter enables the image recording medium to acquire an image of the at least one portion of the scene being a function of the time period during which the at least one illumination source illuminates the scene.

In another aspect, the invention provides an image acquisition arrangement comprising a plurality of cameras mounted on a support, each camera having an image recording medium, the cameras and support being constructed of materials having respective coefficients of thermal expansion and configured to maintain the cameras' image recording media in fixed relation to each other.

In yet another aspect, the invention provides an image acquisition arrangement comprising at least one camera comprising an image recording medium configured to generate signals in electrical form representative of an image, the image recording medium being housed in a housing, the housing being configured to shield the image recording medium from electromagnetic interference originating outside of the housing. In other aspects, other elements of the image acquisition arrangement, including power supplies that provide power to the at least one camera, and communication links linking the at least one camera to an image processing subsystem, are also relatively impervious to electromagnetic interference.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 schematically depicts an illumination source that is useful in the digital imaging and mensuration system that is schematically depicted in FIG. 1;

FIG. 3 schematically depicts a camera that is useful in the digital imaging and mensuration system that is schematically depicted in FIG. 1; and FIG. 4 is a timing diagram depicting relationships among camera exposure times and illuminations by the illumination sources in the digital imaging and mensuration system that is schematically depicted in FIG. 1.

DETAILED DESCRIPTION OF AN ILLUSTRATIVE EMBODIMENT

Figure 1:
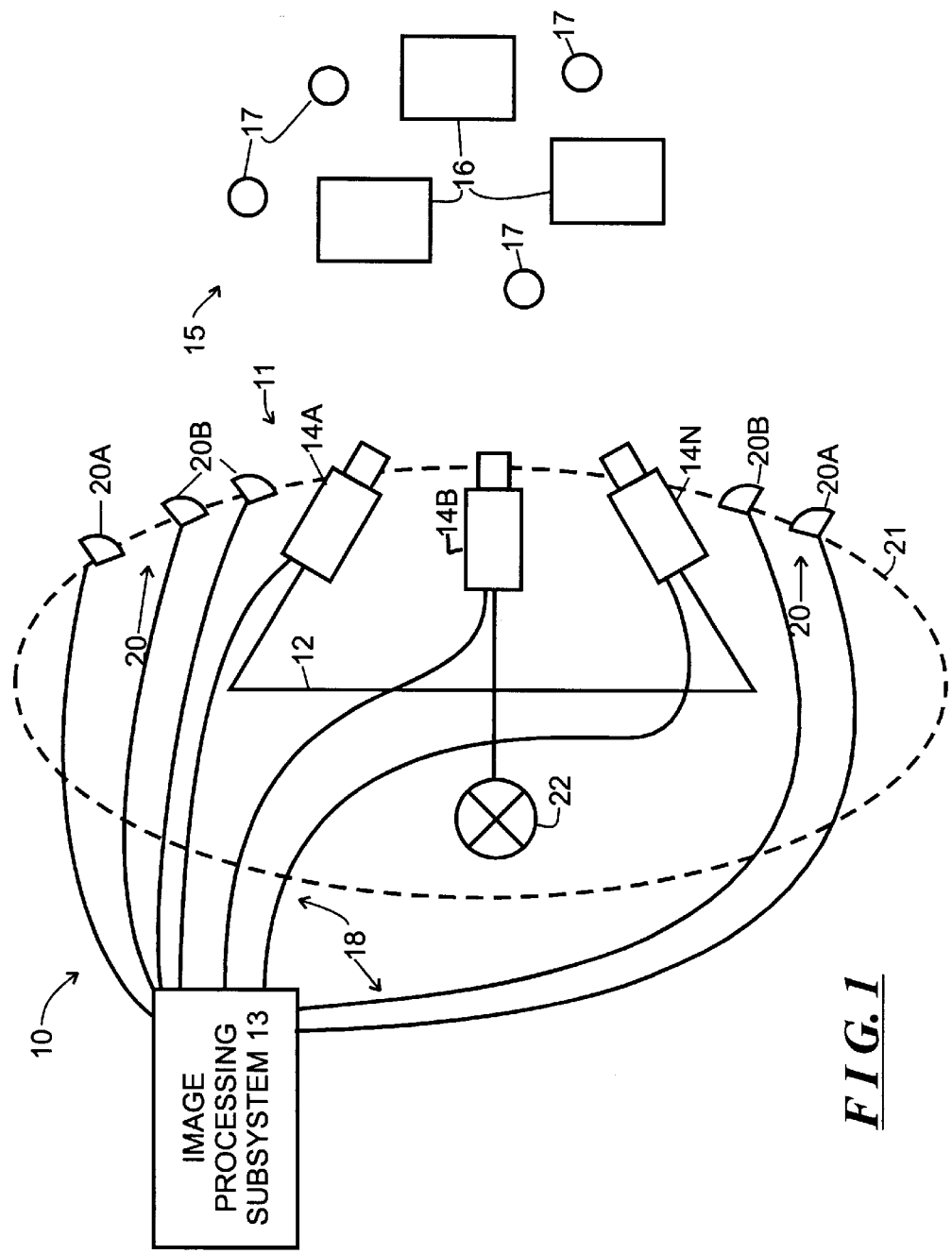
FIG. 1 schematically depicts a digital imaging and mensuration system constructed in accordance with the invention.

FIG. 1 schematically depicts a digital imaging and mensuration system (generally, "digital imaging system") 10 constructed in accordance with the invention. The digital imaging system 10 includes an optical head 11 and image processing subsystem 13. The optical head 11 comprises a rig 12 on which is mounted one or more cameras 14A, . . . , 14N (generally identified by reference numeral 14n) and illumination sources generally identified by reference numeral 20 mounted in a housing 21. Each of the illumination sources 20 provides illumination for the scene 15, during which the cameras acquire one or more images of a scene 15. The rig 12 is provided with a motion capability represented by a motor 22, that can translate and/or rotate the optical head 11 relative to the scene 15 to allow the cameras 14n comprising the optical head 11 to acquire sets of images of the scene 15 from a plurality of positions and angular orientations relative to the scene 15. In one embodiment, the cameras 14n comprising the optical head 11 include image sensing and recording media such as CCD (charge coupled devices) or CMOS (complementary metal oxide semiconductor) devices, which record images in electronic form, and the cameras 14n download the images to the image processing subsystem 13 after they are acquired for processing. The image processing subsystem 13 communicates with the cameras 14n and illumination sources to control them as described below, and to receive information defining the images acquired by the cameras 14n for processing, both over communication links generally identified by reference numeral 18. The image processing subsystem 13 can also control the motor 22 to enable the optical head 11 to be moved from one position and/or angular orientation relative to the scene 15, to another position and/or angular orientation relative to the scene 15.

The particular processing operations that are performed by the image processing subsystem 13 will depend on the particular application for which the digital imaging system 10 is being used. If, for example, the digital imaging system 10 is to be used for mensuration of elements of the scene 15, the image processing subsystem 13 can generate any of a number of types of information related to objects, generally identified by reference numeral 16, in the scene, including, for example, dimensions of features, such as holes and surface points on respective ones of the objects, distances between surface points, features, geometrical primitives such as "plane," "line," "cylinder" and the like on selected ones of a plurality of object(s), distances between surface points or features on objects 16 in the scene and some reference plane such as a floor, and other types of information as will be apparent to those skilled in the art. Similarly, if the digital imaging system 10 is to be used to generate a virtual three-dimensional reconstruction or texture draping of one or more of the objects 16 in the scene, it can generate such a virtual reconstruction using one or more of a number of techniques that are known to those skilled in the art. In addition to the object(s) 16 that are to be measured, reconstructed, and so forth, the scene may also be provided with a plurality of anchor points or targets, generally identified by reference numeral 17, whose positions relative to a selected global coordinate system are known. As will be appreciated by those skilled in the art, a virtual reconstruction of a portion of a scene, from a set of images of that portion of the scene, will be in relation to a coordinate system that is related to that set of images, and the targets 17 facilitate relating such local virtual reconstructions to a unitary global coordinate system. Similarly, if the features of the objects undergoing mensuration and/or reconstruction require that multiple sets of images be acquired for the mensuration and/or reconstruction, the coordinates of the features as determined using the respective sets of images will need to be related to a unitary global coordinate system to enable them to be mensurated and/or reconstructed, and the targets facilitate that operation as well.

As noted above, the scene 15 is illuminated by illumination sources, generally identified by reference numeral 20. As will be described below, at least some of the illumination sources, which will be identified by reference numeral 20A, provide uniform, unstructured illumination for illuminating the targets 17, which will facilitate precisely locating the targets 17 in the scene by the image processing subsystem 13. In addition, the unstructured illumination can also be used to illuminate the objects 16 to facilitate feature measurement and/or texture dropping. On the other hand, others of the illumination sources, which will be identified by reference numeral 20B, provide structured, textured illumination for illuminating the object(s) 16 in the scene for other purposes. Structured illumination is used to provide a pattern or texture on the object(s) 16 in the scene 15 that aids the image processing subsystem 13 in identifying matching points as among images comprising a set of images that are used in generating a local virtual reconstruction, that is, points in the images in the set that are images of the same point in the scene 15, which is useful in determining their coordinates in the respective local coordinate system. Generally, in a scene 15 that includes the objects 16 that are to be subject to mensuration, virtual reconstruction, and the like, and that may also include targets 17, at least two successive images are acquired, one with texture illumination that is used in virtual reconstruction of object 16 and another with uniform illumination to measure the targets 17 and for feature measurement and/or texture draping.

Although the digital image and mensuration system 10 has been described as illuminating the scene 15 with both structured and unstructured illumination during acquisition of respective sets of images, it will be appreciated that the scene 15 may be illuminated with structured illumination during acquisition of both sets of images. In that case, both sets of images may be used in generating respective virtual reconstructions of the scene 15, both of which may be used in generating a single virtual reconstruction that may have improved resolution and/or accuracy over the respective virtual reconstructions that are generated from the respective image sets. As another alternative, the scene 15 may be illuminated with structured illumination during acquisition of either one or two sets of images, which may be used in connection with, for example, measurement or virtual reconstruction of the targets 17 and/or for feature measurement and/or texture draping. In both cases, two sets of illumination sources, generally analogous to the various illumination sources 20A and 20B, may be provided, one set illuminating the scene 15 during acquisition of the images comprising the first image set and the second set illuminating the scene 15 during acquisition of the images comprising the second image set. Alternatively, one set of illumination sources may be provided that illuminates the scene 15 during acquisition of the images comprising both image sets.

U.S. patent application Ser. No. 10/025,175 filed Dec. 19, 2001, in the names of Dan Albeck, et al. and entitled Method And Apparatus For Accurate Alignment Of Images In Digital Imaging Systems By Matching Points In The Images Corresponding To Scene Elements (hereinafter referred to as the Albeck, et al., patent application), assigned to the assignee and incorporated herein by reference, describes arrangements and methods for providing disparate forms of illumination for use in discriminating between the targets 17 and objects 16 in the scene 15 and facilitating precisely locating the targets. The image processing subsystem 13 controls the illumination by the unstructured illumination sources 20A and structured illumination sources 20B and the cameras 14n. Generally, in some of the arrangements as described in the Albeck, et al., patent application, the image processing subsystem 13 can control the unstructured and structured illumination sources 20A and 20B and the cameras 14n to acquire separate sets of images, one set of images in which at least the targets 17 are illuminated using unstructured illumination and an other set of images in which at least the objects 16 are illuminated using structured illumination. As described in the Albeck, et al., patent application, the set of images that are acquired while the scene 15 is illuminated using uniform, unstructured illumination, is used to generate reconstructions of the targets 17 for which projections are acquired in the various images comprising the set. The reconstructions of those targets, in turn, are used to generate the relationship between the local coordinate system associated with the location(s) of the cameras 14n from which the image set was acquired and the global coordinate system. Reconstructions of the objects are generated using the image set that is acquired while the scene 15 is illuminated using textured, structured illumination, and the relationship between the local coordinate system and the global coordinate system can, in turn, be used to relate the reconstructions of the objects in the local coordinate system to the global coordinate system.

Several problems can arise in connection with a system such as the digital imaging system 10 depicted in FIG. 1 and described in connection with the Albeck, et al., patent application. Generally, it will be desirable to provide that the sets of images be acquired within a short period of time of each other. This will have several benefits. For example, in an industrial environment, there may be mechanical vibration of the optical head 11 that may be due to movement thereof to facilitate acquiring sets of images of various portions of the scene 15 and/or from various angular orientations relative to the scene 15. In addition, there may be mechanical vibration of one or more of the optical head 11, objects 16 and targets 17 in the scene 15 due to ambient vibrations in the environment, which may be introduced through the surfaces of the floor, walls or ceiling, air movements, and other sources as will be appreciated by those skilled in the art. In that case, the positions and angular orientations of the respective cameras 14n relative to the scene 15 when the first set of images is acquired, may differ from their positions and angular orientations when the second wet of images is acquired, and so the information processed from the two sets of images cannot be correlated. For example, the relationship between the local and global coordinate systems associated with the set of images that are acquired when the scene is illuminated using structured illumination may differ from the relationship that is determined using the set of images that are acquired when the scene is illuminated using unstructured illumination. Accordingly, when the relationship that is determined using the set of images that are acquired when the scene is illuminated using unstructured illumination is used to transform the reconstructions of the objects 16 from the local to the global coordinate system, the transformation may differ from the correct one.

Another problem that can arise in connection with mechanical vibration is that there may be some motion blur in the images as acquired by the cameras 14n due to movement of the respective cameras 14n during the exposure time during which the cameras acquire the respective images. A blurred image can reduce the accuracy and/or resolution of a three-dimensional reconstruction that is generated using the respective image.

A further problem that can be encountered arises from the fact that reconstructions are generated using information that reflects the various optical characteristics of the individual cameras 14n, including, for example, their focal lengths, as well as the displacements and angular orientations of the cameras 14n relative to each other. Typically, the optical characteristics of the respective cameras are functions of, for example, the shape(s) of the various lenses comprising the optical path for the camera, the distance(s) of the lenses from the camera's image plane, and other characteristics as will be appreciated by those skilled in the art. This information is typically generated during a "calibration" operation. While it would generally be possible to frequently recalibrate to reflect possible changes in displacement and/or angular orientation of two or more of the cameras 14n relative to each other, calibration can often require an undesirable amount of time and computing power. Accordingly, it is generally desirable to provide the rig 12 such as to minimize changes in displacements and angular orientations of the cameras 14n relative to each other.

As yet another problem, interference, primarily electromagnetic noise that may be incident on the digital imaging system 10, can create noise in the control signals transmitted from the image processing subsystem 13 to the cameras 14n that control their image acquisition and information download operations, noise in the images as acquired by the cameras 14n, noise in control signals used to control illumination of the various illumination sources 20, noise in the signals representing the images that the cameras 14n transmit to the image processing subsystem 13 for processing, and other types of noise as will be appreciated by those skilled in the art.

In accordance with the invention, the digital imaging and mensuration system 10 includes a number of features to address these problems.

In accordance with one aspect of the invention, the illumination sources 20, including both the illumination sources 20A that provide unstructured illumination and the illumination sources 20B that provide structured illumination, are configured to provide illumination in very short pulsed form. In one embodiment, the illumination sources 20A, 20B provide illumination in time periods of on the order of $10^{-4}$ seconds. Preferably, the upper bound in the period of time during which the respective illumination sources 20A, 20B will provide illumination (that is, the preferred longest time period during which that the illumination sources 20A, 20B will provide illumination) will be $10^{-3}$ seconds, to minimize motion blur that might occur if the cameras 14n and objects 16 and/or targets 17 in the scene 15 are moving relative to each other while the cameras are acquiring the respective images. On the other hand, it will be appreciated that, illumination sources 20A, 20B that are able to provide illumination in a time period less than $10^{-4}$ seconds of sufficient energy that would allow the cameras 14n to acquire satisfactory images, would also be suitable. The illumination sources 20 comprise flash lamps, optical components and electronic driving circuitry, which will be described in connection with FIG. 2, that can provide an amount of light energy that is sufficient to illuminate the targets 17 and objects 16 in the scene so as to enable the cameras 14n to be able to acquire images as described below that can be processed by the image processing subsystem 13.

With reference to FIG. 2, that FIG. schematically depicts an illustrative illumination source, identified by reference numeral 30, constructed in accordance with the invention. Illumination source 30 is provided with an arrangement for providing structured illumination, and thus would be suitable for use as an illumination source 20B (FIG. 1), but it will be appreciated that, with a modification that will be addressed below, an illumination source having a similar structure may provide unstructured illumination and thus be suitable for use as an illumination source 20A. Illumination source 30 includes a flash lamp 31, a reflector 32, a light guide 33, a rear lens system 34r, a texture mask 35, and a forward lens system 34f, all of which are housed in a housing 36. A power supply 37, which may be positioned inside of the housing 36 or outside thereof, is provided to provide electrical power to the flash lamp 31 in response to control signals from the image processing subsystem 13. In addition, control circuitry (not separately shown), which may also be positioned inside or outside of the housing 36, may be provided to control the operations of the illumination source 30.

In one embodiment, the flash lamp 31 is a short arc xenon flash lamp that can provide a high energy pulse of short duration. The light guide 33 in one embodiment is flexible, and may comprise, for example, an optical fiber that can efficiently carry light of the wavelengths generated by the xenon flash lamp. The reflector 32 collects light emitted by the flash lamp 31 and focuses it on the rear end 33r of light guide 33. The light guide 33, in turn, directs the light from the near end 33n and through the forward end 33f toward the rear lens system 34r. The rear lens system 34r distributes the light that it receives from the light guide 33 preferably with high spacial and angular uniformity over the area subtended by the texture mask 35. The texture mask 35, in turn, distributes the light incident thereon in a random manner, thereby to structure the illumination. The forward lens system 34f projects the texture defined by the mask onto at least some portion of the object(s) 16 in the scene 15 thereby to provide the structured illumination.

It will be appreciated that, if the illumination source 30 is to be used as an illumination source 20A for providing uniform, unstructured illumination, the texture mask 35 can be omitted. In that case, the illumination source may comprise a single lens system not shown that distributes uniform, unstructured illumination instead of textured illumination over at least some portion of the target(s) in the scene.

In one embodiment, that is schematically depicted in FIG. 2, the housing 36 for illumination source 30 actually comprises two sections, including a rear section 36r that houses the flash lamp 31 and reflector 32, and a forward section 36f that houses the lens system 34r and, if provided, the texture mask 35. The rear section 36r and forward section 36f are effectively interconnected by the light guide 33. If the light guide 33 comprises a flexible link, such as may be provided by an optical fiber, the rear section 36r, along with the flash lamp 31 and reflector 32 contained therein, may be positioned in one location within the housing 21 of the optical head 11 (FIG. 1), and the forward section 36f, along with the lens system 34r and, if provided, texture mask 35, may be positioned in another location on the housing 21 and perhaps disposed at an angle relative thereto. Thus, the two sections 36r and 36f may be conveniently disposed in diverse locations of the housing 21 of the optical head 11, with the forward section 36f positioned on the housing 21 and disposed at a suitable angle to facilitate illumination of at least some portion of the scene 15.

Further in accordance with this aspect of the invention, the cameras 14n are conditioned to acquire respective images in an image set in a time period that is determined by the amount of light energy provided by the illumination sources 20A, 20B, and the sensitivity of the respective camera 14n. An illustrative camera 14n will be described below in connection with FIG. 3. In addition, the timing of the illumination by the illumination sources 20A, 20B, and the image acquisition by the cameras 14n will be described in connection with a timing diagram in FIG. 4.

Generally, in one embodiment, the cameras 14n are constructed in accordance with the well-known Interline Transfer CCD architecture, and which further have the capability of acquiring two successive images with a time interval therebetween of less than $5*10^{-6}$ seconds (where "*" refers to the multiplication operation). Thus, each camera 14n can acquire, for example, an image set using unstructured illumination provided by illumination sources 20A, and, less than $5*10^{-6}$ seconds after the cameras' shutters close thereafter, acquire an image set using structured illumination. The cameras 14n do not need to transfer the images comprising the first image set to the image processing subsystem 13 before they acquire the images comprising the second image set, but, after they have acquired both images, they will need to wait until the images comprising at least one set are transferred to the image processing subsystem 13 before they can acquire images comprising another image set.

In addition, each camera 14n is provided with two shutters, including an electronic shutter and a mechanical shutter. The electronic shutter actuates to control acquisition of separate images while the illumination sources 20A and 20B are providing illumination, and the mechanical shutter is actuated for the entire time the images are being acquired. The mechanical shutter is provided to ensure that contributions to the images as acquired by the respective camera that may be due to ambient illumination that may be provided by illumination sources other than illumination sources 20A and 20B can be minimized. Such other illumination sources may be provided in an industrial environment, and typically will provide unstructured illumination, so providing the cameras 14n with such second shutters will reduce noise in the images acquired while the illumination sources are illuminating the scene. In addition, the mechanical shutter 54 can help prevent saturation of the image recording media of the respective cameras, which may happen due to ambient illumination. This helps facilitate using the digital imaging system 10 in an industrial environment, in which ambient illumination may be provided that may also illuminate the scene 15.

FIG. 3 schematically depicts a camera, which will be identified by reference numeral 50, that is useful in connection with the invention. The camera 50 as schematically depicted in FIG. 3 may be used as any of the cameras 14n comprising the optical head 11 of the digital image and mensuration system depicted in FIG. 1. With reference to FIG. 3, the camera 50 includes an image plane 51, a lens system 52, an electronic shutter represented by dashed line 53, and a mechanical shutter represented by dashed line 54, all within a housing 55. The camera 50 also includes a camera control module 56, which may be positioned inside or outside of the housing 55, for controlling the other components of the camera 50 in response to control signals from the image processing subsystem 13. The lens system 52 comprises one or more lenses (not separately shown) and an arrangement that, under control of the camera control module 56, can focus an image of the scene 15 onto the image plane 51.

The image plane 51 comprises an image plane that may be provided in a camera constructed in accordance with the aforementioned Interline Transfer CCD architecture, including, for example, an array of light-sensitive photo-diodes and associated light-shielded CCD devices. Generally, each photo-diode generates an electrical signal in response to light incident thereon, with the amplitude of the signal representing the intensity of the light incident thereon. Unlike the camera's mechanical shutter 54, the electronic shutter 53 is not a physical shutter; instead, the electronic shutter 53 represents circuitry that transfers signals provided by the photodiodes representative of the intensity of light thereon at that time in parallel to the CCD array. The CCD array, in turn, serially shifts the signals to other circuitry that digitizes them and transfers the digitized signals to a storage device (not shown) or the image processing subsystem 13 for processing. While both the mechanical shutter 54 and the electronic shutter 53 are "open," the photodiodes exposed to the scene 15 generate signals representative of the intensity of light incident thereon at that time to facilitate acquisition of a first image, and when the electronic shutter is "closed" at the end of a first exposure period, the signals defining the first image are shifted to the light-shielded portion. After the signals defining the first image have been shifted to the light-shielded portion, the electronic shutter 53 can be opened again to enable the photo-diodes in the light-sensitive portion to again generate signals representative of the intensity of the light incident thereon at that time to facilitate acquisition of a second image.

While the electronic shutter is open during acquisition of the second image, the signals defining the first image are shifted by the circuitry in the light-shielded portion to the digitizing circuitry for digitization. Since this can take on the order of $10^{-1}$ seconds, which is longer than a desirable exposure time for acquisition of an image, and since the electronic shutter cannot again be closed while it is shifting the signals defining the first image (since that would enable the signals defining the second image to be shifted to the light-shielded portion, which would cause interference with the signals defining the first image which are still being shifted), the mechanical shutter 54 is provided to control the exposure time for the acquisition of the second image. After the signals defining the first image have been digitized and stored or transferred to the image processing subsystem 13, the electronic shutter 53 is again closed to enable the signals defining the second image to be shifted to the light-shielded circuitry, which shifts them to the digitization and storage circuitry.

FIG. 4 depicts a timing diagram useful in understanding the sequence and timing of operations by the various components of the cameras 14n and the illumination sources 20A, 20B in connection with the illustrative embodiment described herein. Generally, the timing diagram comprises a plurality of lines that together illustrate the relationships among the times that the mechanical shutter 54 and electronic shutter 53 are open (in this case, the electronic shutter is "open" when it is actuated as described above), and the illumination sources 20A, 20B are providing illumination, for the images acquired by the respective camera 14n. The legends "$1^{ST}$ EXP" ("first exposure") and "$2^{ND}$ EXP" ("second exposure") along the bottom of the timing diagram indicate the times during which the cameras 14n will acquire the images while the scene 15 is illuminated by the illumination sources 20A, 20B. The line labeled "$1^{ST}$ ILLUMINATION" represents the timing during which at least some of the illumination sources 20, illustratively illumination sources 20A, illuminate at least some portion of the scene 15 to facilitate acquisition of a first image set of the scene 15. Similarly, the line labeled "$2^{ND}$ ILLUMINATION" represents the timing during which at least some of the illumination sources, illustratively the illumination sources 20B, illuminate at least some portion of the scene to facilitate acquisition of a second image set of the scene 15. The line labeled "ELECTRONIC SHUTTER" represents the timing during which the electronic shutter 53 of the respective camera 14n is open, as described above. The line labeled "MECHANICAL SHUTTER" represents the timing during which the mechanical shutter 54 is open. In the timing diagram depicted in FIG. 4, a respective shutter 53, 54 is "open" and a respective illumination source 20A, 20B is providing illumination between the times represented by the leading and trailing edges of the respective line of the timing diagram. The line labeled "START" illustratively depicts a pulse at a time $T_0$ that represents the start of an image acquisition process during which the cameras 14n and illumination sources 20A, 20B are controlled to acquire images of the scene 15. The pulse depicted on the START line may, but need not, actually be generated or utilized by the image processing subsystem 13.

Thus, and with further reference to FIG. 4, the image processing subsystem 13 will, at a time $T_1$ contemporaneous with or shortly following the start time $T_0$, generate a signal that enables the cameras 14n to open their mechanical shutters 54. At a later time $T_2$, the image processing subsystem 13 will generate a signal that enables the illumination sources 20 that are to illuminate the scene 15 during the first exposure time, and at yet a later time $T_3$ the image processing subsystem 13 will generate a signal that enables the cameras' electronic shutters 53 to open. The time period between time $T_1$, at which the cameras' mechanical shutters 54 begin to open, and time $T_3$, at which their electronic shutters 53 begin to open, is preferably long enough to allow the mechanical shutters to open before the signal is generate to enable the electronic shutters 53 to open; in one embodiment, the time period between times $T_1$ and $T_3$ is on the order of $10^{-3}$ seconds.

The ones of the illumination sources 20 that illuminate the scene 15 during the acquisition of the first set of images will provide illumination until time $T_4$ and the cameras' electronic shutters 53 will be open until a subsequent time $T_5$. The "$1^{ST}$ EXP" ("first exposure") time period during which the images comprising the first image set are acquired, will be the period between time $T_3$, the time at which the illumination sources begin illuminating the scene 15, and time $T_5$, the time at which the cameras' electronic shutters 53 are closed. In the illustrative embodiment described herein, the "$1^{ST}$ EXP" ("first exposure") time period, which is on the order of $10^{-4}$ seconds. The period between times $T_4$ and $T_5$ is preferably minimal to minimize acquisition of background noise, and is preferably on the order of $10^{-5}$ seconds.

At time $T_5$, the end of the time period during which the electronic shutters 53 are indicated as being "open" in FIG. 4, the camera's electronic shutters 53 "closes" to shift signals representing the image from the light-sensitive portion of the camera's sensor to a light-shielded portion that, in turn, shifts the signals to digitizing circuitry, that converts the signals to digital form for transfer to the image processing subsystem 13 for processing. After the signals have been shifted to the light-shielded portion of the sensor, the cameras 14n will be in condition to acquire the images comprising the next image set.

Accordingly, in each camera 14n the time period for the second exposure will be determined by the time during which electronic shutter 53 is re-opened and the time that the camera's mechanical shutter 54 is open. Shortly after the cameras' electronic shutters 53 have closed (time $T_5$) to end the time period during which the images are acquired during the first exposure time, the electronic shutters 53 are re-opened to initiate the acquisition of the images of the scene 15 comprising the second image set. The image processing subsystem 13 will enable the illumination sources that are to illuminate the scene during acquisition of the second image set to begin providing illumination very shortly after the electronic shutters 53 have re-opened. In the illustrative embodiment described herein, the time period between the point in time that the electronic shutters 53 close at the end of the first exposure period and the point in time at which the illumination sources that are to illuminate the scene during the second exposure period begin providing illumination will preferably be less than or on the order of $5*10^{-6}$ seconds.

Thus, after the image processing subsystem 13 enables the illumination sources that illuminate the scene during the first exposure period to stop providing illumination at time $T_4$ and the electronic shutters 53 to close at time $T_5$, it will enable the electronic shutters 53 to re-open at time $T_6$, and the illumination sources that are to illuminate the scene 15 during the second exposure time to begin providing illumination at time $T_7$, thereby to initiate acquisition of the images during the second exposure time. A selected time thereafter, the image processing subsystem 13 will enable the illumination sources to stop illuminating the scene 15 (reference time $T_8$) and enable the cameras' mechanical shutters 54 to close (reference time $T_9$). Since the mechanical shutters 54 typically require on the order of $10^{-3}$ seconds to close, the image processing subsystem 13 will preferably wait until the illumination sources stop illuminating the scene 15 (time $T_8$) before closing the mechanical shutters 54 (time $T_9$) so that the respective cameras 14n will acquire the images while the scene 15 is illuminated by the respective illumination sources for a time that will be uniform across the respective images. On the other hand, it will be desirable to provide that the cameras' mechanical shutters 54 begin closing as shortly after time $T_8$ as possible, to minimize noise in the images that may arise from ambient illumination. The electronic shutters 53 close at time $T_{10}$.

It will be appreciated that, at some point in time after the mechanical shutters 54 close at time $T_8$, the image processing subsystem 13 can enable the operations described above in connection with FIG. 4 to be repeated. This may occur before the optical head 11 was moved to a new location and orientation relative to the scene 15, or, alternatively, after the optical head 11 was moved to a new location and orientation relative to the scene 15. However, since the time period during which each image is acquired is relatively short, if, following a movement of the optical head 11, there is any vibration of the optical head 11 while the cameras are acquiring the individual images which might otherwise result in blurring, the blurring can be minimized. In addition, since the time period between the first and second exposure period is relatively short, any movement of the optical head 11 between the exposure periods will also be relatively small, and would unlikely to be of sufficient magnitude that the local coordinate system for a three-dimensional reconstruction or measurement of the scene 15 from the images acquired during the first camera exposure would differ from the local coordinate system for the scene 15 from the images acquired during the second camera exposure. Accordingly, the image processing subsystem 13 would be readily able to use the relationship between the local coordinate system and the global coordinate system as determined from the three-dimensional reconstruction of the targets 17 to transform the three-dimensional reconstruction of the objects from the local coordinate system to the global coordinate system, with a minimum of error. Generally, all information obtained from the first image set, acquired during the first exposure period, can readily be correlated with the information obtained from the second image set, acquired during the second exposure period.

The time period during which the respective illumination sources are energized to provide illumination, on the order of $10^{-4}$ seconds, reflects a trade-off among several factors, including intensity of the illumination provided by the xenon flash lamp, the lifetime of the xenon flash lamp, and cost. Accordingly, it will be appreciated that other embodiments may utilize a time period that differs from that described herein, and, in addition, may utilize different time periods for the respective first and second exposure times. The time period of on the order of $10^{-4}$ seconds is selected to minimize the effect of motion blur that may occur if the cameras 14n and objects 16 and/or targets 17 in the scene 15 are moving relative to each other while the cameras 14n are acquiring the respective images, and, accordingly, it is desirable that the time periods not be longer than on the order of $10^{-3}$ seconds.

In accordance with another aspect of the invention, the rig 12 that supports the cameras 14n and illumination sources 20 is fabricated from a material that has a very low coefficient of thermal expansion proximate room temperature, preferably a coefficient of less than $5*10^{-6}$ $1/°$ C. Illustrative materials that exhibit such a thermal expansion coefficient and that exhibit a very high degree of dimensional stability include materials such as composites, certain ceramic materials, and certain steel alloys having a high nickel content. An illustration of steel alloys having a high nickel content include, for example, alloys those that are sold under the trademark Invar®. Because of its dimensional stability provided by this selection of materials, the rig 12 maintains the CCD image recording media of the various cameras 14n at fixed lateral displacements and angular orientations with respect to each other. In addition, other components of the cameras 14n, including in particular the imaging lenses and arrangements that maintain the imaging lenses in selected relation to the CCD image recording media after the cameras are calibrated, are fabricated from materials that have low temperature dependence and high mechanical stability to ensure that the cameras 14n are able to remain calibrated following the calibration operation.

Except as described below, generally, materials such as aluminum, steel or other metallic materials, other than those having high nickel content, are preferably not used in either the rig 12 or these camera components since they have a relatively high coefficient of expansion and, since in an industrial environment it is generally difficult if not impossible to maintain a uniform temperature and humidity and so the cameras 14n may rapidly go out of calibration, which may necessitate frequent re-calibration operations, particularly since the cameras 14n may go out of calibration unpredictably. In addition, if materials were used that may have a relatively high coefficient of expansion as a function of temperature and/or humidity, it may be necessary to provide devices for measuring ambient temperature and/or humidity to determine when it may be desirable to perform a re-calibration, which devices would not be necessary if the rig 12 and cameras 14n are fabricated from materials described above.

In addition to use of materials with low coefficients of thermal expansion at room temperature, or alternatively, different portions of the rig 12 and cameras 14n may be made from materials having larger coefficients of thermal expansion at room temperature. In that design, critical dimensions are kept constant with temperature in such a way that temperature expansion of some parts of the mechanical structure are compensated by the temperature expansion of other parts of the mechanical structure.

In yet another aspect of the invention, the invention provides several arrangements whereby the digital image and mensuration system 10 can minimize or at least reduce effects of electromagnetic interference ("EMI") on image acquisition by the cameras 14n and transfer of the image information to the image processing subsystem 13. In the illustrative embodiment described herein, this is accomplished in two general ways. First, the power supply (not separately shown) that provide electrical power to each camera 14n and the power link that transfer power from the power supply to the respective are shielded to prevent EMI from creating noise in the electrical power. It will be appreciated that noise in the electrical power provided to a camera 14n can result in noise in the images as acquired by the respective camera 14n. Similarly, each camera 14n is constructed of materials that shield the interior of the respective camera 14n, particularly the image plane 51 and camera control circuitry 56 (FIG. 3), from EMI which also can result in noise in the images as acquired by the respective camera 14n. In both cases, since the signals provided by the photodiodes to the CCD devices, and the signals shifted by the CCD devices, are in analog form, EMI can result in changes in the amplitude of the analog signals from their correct amplitudes, which, in turn, is reflected in noise in the image when the analog signals are digitized.

Second, the communication links 18 that carry the digital signals from the cameras 14n to the image processing subsystem 13 are constructed to as to be relatively impervious to EMI. In one embodiment, the communication links 18 are in the form of EMI-resistant optical fiber links, which transfer the signals in optical form. This ensures that EMI to which the communication links 18 might be subjected do not interfere with the digital signals that are transferred from the cameras 14n to the image processing subsystem 13.

The invention provides a number of advantages. In particular, the invention provides arrangements that enable an optical head 11 for a digital imaging system 10 to be used in an industrial environment, and avoid a number of problems that can arise in such an environment, including, for example, noise in images acquired by the cameras 14n comprising the optical head 11 that can arise from a number of sources, including mechanical vibration and ambient illumination. In addition, the invention provides an arrangement that allows for such an optical head 11 to be provided with a high degree of dimensional stability so that changes in temperature and humidity, which can be common in an industrial environment, will not generally result in dimensional changes that would necessitate frequent re-calibration of the optical head. Furthermore, the invention provides arrangements that reduce or minimize effects that may be caused by EMI in the cameras' acquisition of images and transfer of signals representative thereof to the image processing subsystem 13.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An image acquisition arrangement for acquiring at least one pair of images of at least one portion of a scene, comprising
   A. at least one camera including an image recording medium and a shutter system comprising a mechanical shutter and an electronic shutter, said shutter system being controllable to enable the image recording medium to acquire said at least one pair of images;
   B. at least one illumination source for providing illumination to said at least one portion of the scene for at least one illumination time period;
   C. a control module configured to control the at least one camera to sequentially acquire said at least one pair of images and to control said at least one illumination source to illuminate the at least one portion of the scene with said at least one illumination source, such as to enable said image recording medium to individually record each image of said pair of images. During an image acquisition time period for each said image that is a function of said illumination time period; wherein said control module is configured:
      (I) to enable the mechanical shutter to open and thereafter enable the electronic shutter to open to enable the image recording medium to begin acquisition of a first of said two images, and subsequently enable the electronic shutter to close at a time that is a function of said image acquisition time period of said first image, and to transfer the first image to a selected intermediate device during a transfer time period;
      (II) to enable the electronic shutter to re-open to enable the image recording medium to begin acquisition of the second image and to enable the mechanical shutter to subsequently close at a time that is a function of said image acquisition time period of said second image; and
      (III) to enable the electronic shutter to remain open for a time period after the mechanical shutter has closed, said time period being a function of the transfer time period of the first image to the selected intermediate device.

2. An image acquisition arrangement as defined in claim 1 in which the time period during which the shutter system of the at least one camera enables the image recording medium to record each said image is selected in relation to possible motion blur that may occur in the at least one image if the at least one camera and at least one portion of the scene were to move relative to each other.

3. An image acquisition arrangement as defined in claim 1, in which the time period during which the shutter system of the at least one camera enables the image recording medium to record said image is selected to minimize possible motion blur that may occur in the at least one image if the at least one camera and at least one portion of the scene were to move relative to each other.

4. An image acquisition arrangement as defined in claim 1, in which the time period during which the shutter system of the at least one camera enables the image recording medium to record said image is selected to be significantly less than a time period for movement of the at least one camera and at least one portion of the scene relative to each other.

5. An image acquisition arrangement as defined in claim 1, in which the control module is configured to enable the mechanical shutter to open to begin recording by the image recording medium of the at least one image prior to beginning of the time period during which the at least one illumination source illuminates the at least one portion of the scene.

6. An image acquisition arrangement as defined in claim 1, in which the control module is further configured to enable the electronic shutter to close following recording of the second of said two images at a time that is a function of the transfer of the first of said two images to the selected intermediate device.

7. An image acquisition arrangement as defined in claim 6 in which the closing of the electronic shutter following recording of the second of said two images enables the transfer of the second of said two images to the selected intermediate device.

8. An image acquisition arrangement as defined in claim 1, the at least one illumination source comprising a first illumination source and a second illumination source, the control module enabling the first illumination source to illuminate said at least a portion of the scene during acquisition of the first image of said pair of images and the second illumination source to illuminate said at least a portion of the scene during acquisition of the second image of said pair of images.

9. An image acquisition arrangement as defined in claim 8, wherein said control module is further configured to enable the electronic shutter to close and terminate recording by the image recording medium of the first said image at a time that is related to the end of the time period during which said first illumination source illuminates the at least one portion of the scene.

10. An image acquisition arrangement as defined in claim 8, wherein said control module is further configured to enable the electronic shutter to open to enable the image recording medium to begin recording said first image at a time that is related to the beginning of the time period during which the first illumination source illuminates the at least one portion of the scene.

11. An image acquisition arrangement as defined in claim 8, wherein the control module is further configured to enable the mechanical shutter to close to terminate recording by the image recording medium of the second said image after the end of the time period during which the at least one illumination source illuminates the at least one portion of the scene.

12. An image acquisition arrangement as defined in claim 8, in which the control module enables the first illumination source to terminate illuminating said at least a portion of the scene after the electronic shutter has enabled the image recording medium to terminate acquisition of the first image of said pair of images.

13. An image acquisition arrangement as defined in claim 12 in which the control module enables the first illumination source to terminate illuminating said at least a portion of the scene after the electronic shutter has enabled the image recording medium to terminate acquisition of the first image of said pair of images and before the image recording medium begins recording the second image of said pair of images.

14. An image acquisition arrangement as defined in claim 8 in which the control module enables the second illumination source to terminate illumination of said at least a portion of the scene at a time that is related to the time at which it enables the mechanical shutter to close.

15. An image acquisition arrangement as defined in claim 8 in which the first illumination source illuminates the at least a portion of the scene with one of uniform or structured illumination.

16. An image acquisition arrangement as defined in claim 15 in which the second illumination source illuminates the at least a portion of the scene with the other of uniform or structured illumination.

17. An image acquisition arrangement as defined in claim 8 in which the second illumination source illuminates the at least a portion of the scene with one of uniform or structured illumination.

18. An image acquisition arrangement as defined in claim 8, in which the control module enables the second illumination source to illuminate at least a portion of the scene substantially immediately after the electronic shutter has enabled the image recording medium to terminate acquisition of the first of said two images.

19. An image acquisition arrangement as defined in claim 8, in which the control module enables the second illumination source to illuminate at least a portion of the scene substantially at a time that is related to the time at which the electronic shutter enables the image recording medium to begin acquisition of the second of said two images.

20. An image acquisition system as claimed in claim 1, wherein said image recording medium is adapted for acquiring two images sequentially with a time interval therebetween, and wherein a first image may be retained therein while a second image is being acquired.

21. An image recording medium as claimed in claim 20, wherein said at least one camera is constructed in accordance with interline transfer CCD architecture.

22. An image acquisition system as claimed in claim 20, wherein the control module is adapted to provide a time period between termination of acquisition of the first image and the beginning of acquisition of the second image that is substantially less than the time required to download the first image to said selected intermediate device.

23. An image acquisition system as claimed in claim 1, wherein the time period between termination of acquisition of the first image and the beginning of acquisition of the second image is in the order of $10^{-6}$ seconds.

24. An image acquisition arrangement as claimed in claim 1, comprising a plurality of said cameras mounted on a support, the cameras and support being constructed of materials having respective coefficients of thermal expansion and configured to maintain the cameras' image recording media in fixed relation to each other.

25. An image acquisition arrangement as claimed in claim 1, wherein said image recording medium is configured to generate signals in electrical form representative of an image, the image recording medium being housed in a housing, the housing being configured to shield the image recording medium from electromagnetic interference originating outside of the housing.

26. An image acquisition arrangement as defined in claim 25 further comprising a power supply configured to generate electrical power for powering the camera, the power supply including circuitry disposed in a housing configured to shield the circuitry from electro-magnetic interference originating from outside of the housing.

27. An image acquisition arrangement as defined in claim 25 further comprising an image processing module connected with the camera by a communications link, the communications link transferring image information, in the form of an electrical signal, from the camera to the image processing module, the communication link being configured so as to be substantially impervious to electro-magnetic interference.

28. An image acquisition arrangement as defined in claim 27 in which the communications link is in the form of an optical fiber.

* * * * *

UNITED STATES PATENT AND TRADEMARK OFFICE
CERTIFICATE OF CORRECTION

PATENT NO.     : 6,801,257 B2
DATED          : October 5, 2004
INVENTOR(S)    : Segev et al.

It is certified that error appears in the above-identified patent and that said Letters Patent is hereby corrected as shown below:

<u>Column 15,</u>
Line 27, please delete "full stop" after "images" and replace "During" with -- during --.

Signed and Sealed this

Eleventh Day of January, 2005

JON W. DUDAS
*Director of the United States Patent and Trademark Office*